(12) United States Patent
Cook et al.

(10) Patent No.: US 7,437,051 B1
(45) Date of Patent: Oct. 14, 2008

(54) SECURE INFRARED BEAMING COMMUNICATION LINK

(75) Inventors: Fred S. Cook, Olathe, KS (US); Mark L. Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1079 days.

(21) Appl. No.: 10/382,959

(22) Filed: Mar. 6, 2003

(51) Int. Cl.
  *G02B 6/00* (2006.01)
(52) U.S. Cl. .................. 385/147; 385/134; 385/135; 385/136; 385/137; 709/203; 709/229; 343/702
(58) Field of Classification Search ......... 385/134–137, 385/147; 242/378; 709/203, 229; 343/702
  See application file for complete search history.

(56) References Cited

U.S. PATENT DOCUMENTS

| | | | |
|---|---|---|---|
| 5,606,594 | A | 2/1997 | Register et al. |
| 6,105,096 | A | 8/2000 | Martinelli et al. |
| 6,137,260 | A | 10/2000 | Wung et al. |
| 6,317,085 | B1 * | 11/2001 | Sandhu et al. ............. 343/702 |
| 6,446,127 | B1 | 9/2002 | Schuster et al. |
| 6,466,658 | B2 | 10/2002 | Schelberg, Jr. et al. |
| 6,915,058 | B2 * | 7/2005 | Pons ........................ 385/135 |
| 2001/0054066 | A1 * | 12/2001 | Spitzer ..................... 709/203 |
| 2002/0065041 | A1 | 5/2002 | Lunsford et al. |
| 2002/0137502 | A1 | 9/2002 | Cronin et al. |

FOREIGN PATENT DOCUMENTS

WO  WO 01/39471  5/2001

OTHER PUBLICATIONS

Agilent Technologies, *Agilent IrDA Data Link Design Guide*, May 2001, pp. 1-66.

* cited by examiner

*Primary Examiner*—Frank G Font
*Assistant Examiner*—Guy G Anderson

(57) ABSTRACT

A secure communication channel is established between a portable computing device and a fixed public network outlet. Infrared beaming is employed wherein the IR beam is confined to an optical fiber placed between the IR beaming ports of the portable device and the fixed outlet. A portable computing device such as a PDA or a laptop PC has an infrared beaming port capable of bidirectional serial communication. A fiber optic system includes an optical fiber, a retractable spool for retaining the optical fiber, a fiber mount for mounting a first end of the optical fiber in alignment with the infrared beaming port of the portable computing device, and a terminator at a second end of the optical fiber. A public network outlet is provided in a fixed location and has an infrared data port in communication with an optical fiber connector adapted to receive the terminator. The infrared data port is in bidirectional serial communication with the infrared beaming port in order to authenticate the portable computing device and to provide public network services in response to the authentication.

8 Claims, 3 Drawing Sheets

SECURE INFRARED BEAMING COMMUNICATION LINK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to the connection and use of mobile computing devices with a fixed public network interface, and, more specifically, to obtaining a secure network connection using a fiber optic system.

Many people, such as travelers, are becoming increasingly reliant upon their mobile (i.e., portable) computing devices for many day-to-day tasks. Examples of portable computing devices include laptop computers and personal digital assistants (PDA's). Typical tasks include establishing and/or managing personal communications (e.g., telephone and electronic mail), conducting transactions (e.g., making reservations and paying by credit card), managing a schedule or calendar, monitoring financial information, and obtaining news and weather information, to name just a few.

When away from a home or office connection, it may often be desired to interface a personal portable device with a fixed outlet into a network such as 1) the public switched telephone network (PSTN) at a payphone or other telephone station to engage in a voice telephone call or 2) a computer data network (e.g., a wide area network, or WAN, connection to the Internet) at a public data terminal or kiosk to engage in computer networking applications such as e-mail. Use of such a fixed network outlet typically involves the use of personal, confidential information which may be transmitted from the personal computing device during use. For example, a phone card number and a personal identification number (PIN) or a credit card number may be used in establishing a pay telephone call (e.g., a long distance call). A private contact list may be consulted to determined a called telephone number. Computer network usernames and passwords may be accessed in launching the desired computer network applications.

The privacy of personal information transmitted by the portable computing devices may be compromised by thieves who actively attempt to obtain the information using various kinds of surveillance and eavesdropping. For example, when information from a PDA or a traditional telephone calling card such as a telephone card number and PIN are entered manually on a telephone keypad, thieves have been known to videotape the keypad entries.

A wireless RF link between a portable device and a fixed station can avoid the visible display of personal information that might be videotaped, but the RF communication signals radiate throughout an uncontrolled area around the device and are subject to being intercepted by thieves. The RF signals can be encrypted, but that requires coordination (e.g., exchange of secret keys) between the sender and receiver, which is often not practical for a public network outlet that is intended to provide service to any requesting device. In this situation, the encryption keys would have to be exchanged in the same unsecured manner and could be intercepted and used by the information thieves using a "man in the middle" ploy or other techniques.

Both PDA's and laptop computers are typically provided with an infrared (IR) beaming port for achieving serial communication using one of the IrDA standards of the Infrared Data Association. The IR beam for such a beaming operation spreads over a defined angular region to ensure that the desired receiver is illuminated by the IR beam. However, there is substantial spillage beyond the intended receiver which makes it possible for thieves to intercept the transmitted data when used in a public place.

SUMMARY OF THE INVENTION

The present invention has the advantage of enabling a secure communication channel between a portable computing device and a fixed public network outlet. Infrared beaming is employed wherein the IR beam is confined to an optical fiber placed between the IR beaming ports of the portable device and the fixed outlet. The invention obtains a low cost of hardware by using available IR beaming components which are both reliable and inexpensive. A cheaply-produced optical fiber having relatively low optical performance can be employed due to the short distance involved.

In one aspect of the invention, a secure communication system is provided. A portable computing device has an infrared beaming port capable of bidirectional serial communication. A fiber optic system includes an optical fiber, a retractable spool for retaining the optical fiber, a fiber mount for mounting a first end of the optical fiber in alignment with the infrared beaming port of the portable computing device, and a terminator at a second end of the optical fiber. A public network outlet is provided in a fixed location and has an infrared data port in communication with an optical fiber connector adapted to receive the terminator. The infrared data port is in bidirectional serial communication with the infrared beaming port in order to authenticate the portable computing device and to provide public network services in response to the authentication.

DETAILED DESCRIPTION OF PREFERRED EMBODIMENTS

Figure 1:
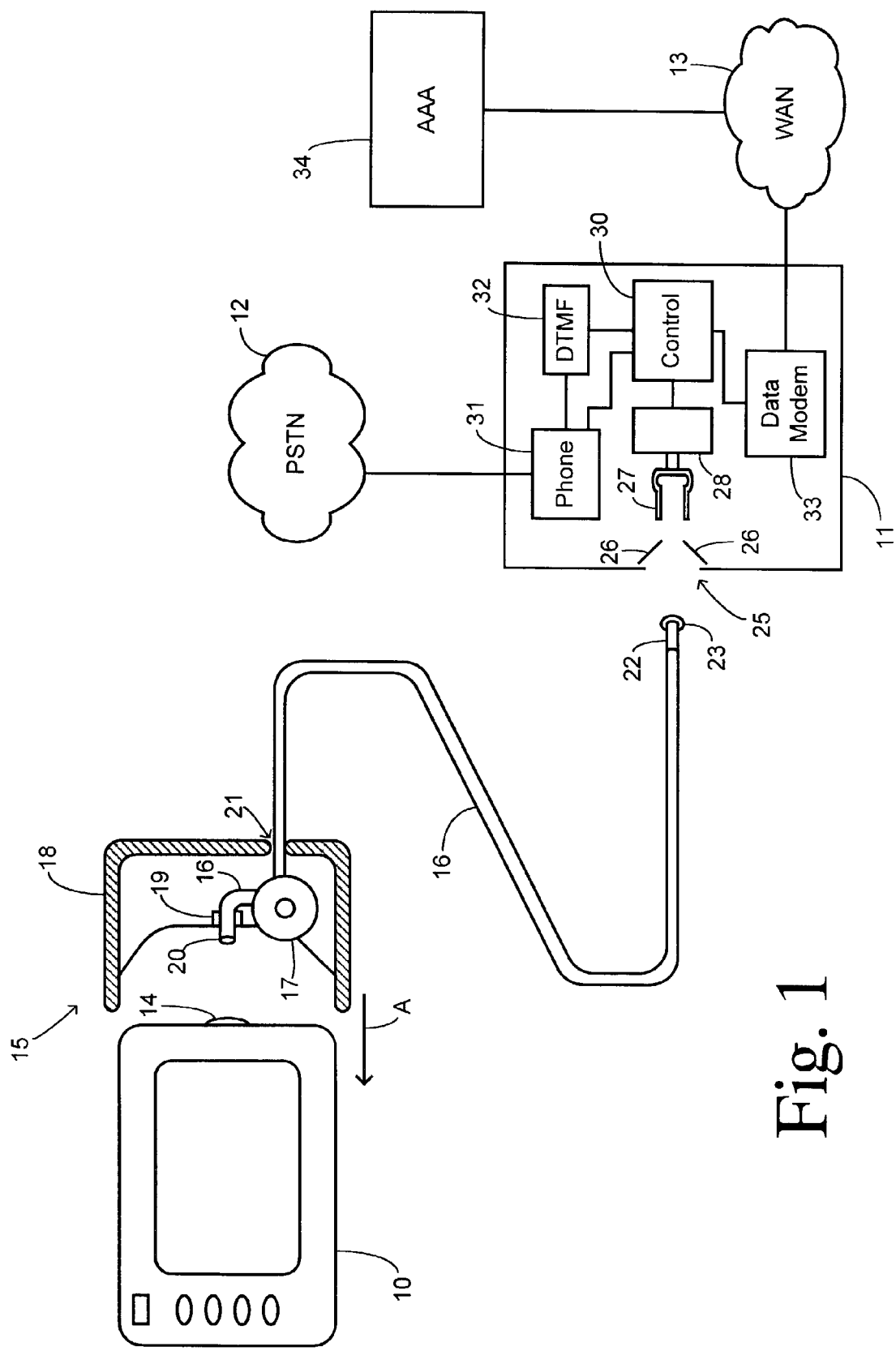
FIG. 1 is a block, schematic diagram showing one embodiment of the overall system of the present invention.

Referring to FIG. 1, a portable computing device 10 is shown as a personal digital assistant (PDA) or personal information device (PID), but could also be comprised of any other handheld device, tablet, laptop PC, or mobile computing device. A fixed network outlet 11 makes a network connection available to a public switched telephone network (PSTN) 12 and/or a data network 13 such as a wide area network (WAN) which may include the Internet. Outlet 11 may be constructed as part of a payphone or an Internet kiosk, for example, which is located in a public place such as an airport terminal, hotel, shopping mall, or other publicly accessible area.

PDA 10 is shown as a conventional unit including an IR beaming port 14 which is capable of serial communications in conformance with standards and protocols defined by the Infrared Data Association (IrDA). IR transmission/reception pulses to/from an IrDA transceiver extend in a cone which may have a width in the range of about 30° to about 60° and should have an effective range in open air of about 1 meter. Rather than radiating through open air, however, the present invention blocks open air radiation and routes the IR pulses through an optical fiber which cannot be intercepted by a third party. In the embodiment of FIG. 1, an accessory 15 comprises a fiber optic system which is releasably attached to PDA 10 (e.g., by sliding-on in the direction of attachment arrow A). An optical fiber 16 is partially wound on a retractable spool 17 which is housed within a sleeve member 18. A fiber mount 19 holds a first end 20 of optical fiber 16 in a fixed position within sleeve member 18. Sleeve member 18 conforms to the shape of PDA 10 and when joined to PDA 10 (e.g., by sliding, snapping-on, or other means of releasable attachment), first end 20 of optical fiber 16 is held in alignment with IR beaming port 14.

Optical fiber 16 exits sleeve member 18 via an aperture 21 and has a second end having a terminator for coupling to fixed outlet 11. Spool 17 pays out optical fiber 16 to provide a desired length of optical fiber 16 to reach outlet 11. Spool 17 may use a conventional spool retractor mechanism so that a desired length can be locked in place during use and subsequently retracted (e.g., by a quick tug on fiber 16 similar to operation of a window shade). Depending upon the optical quality (i.e., losses) of optical fiber 16, it may be possible for the total length of optical fiber 16 to exceed one meter.

Optical fiber 16 extends from sleeve member 18 through an aperture 21. The terminator may include a ferrule 22 with a grasping collar 23 at its distal end whereby the second end of optical fiber 16 passes through ferrule 22 and collar 23 to an exposed end for transferring IR radiation. Aperture 21 may be sized to accommodate ferrule 22 to allow collar 23 to abut the exterior surface of sleeve member 18 when retracted. By keeping the tolerance of aperture 21 around optical fiber 16 small and/or by arranging the interior components so that there is no open path directly between IR beaming port 14 and aperture 21, there is no significant leakage of IR radiation through aperture 21. A gasket or shroud can also be provided to block any leakage.

Fixed outlet 11 includes an optical fiber connector 25 for receiving the second end of optical fiber 16. An environmental cover 26 such as a hinged doorway protects a receptacle 27 when not in use and opens upon insertion of collar 23 so that it may be connected to receptacle 27. At least a portion of receptacle 27 is transparent to IR radiation so that when collar 23 is retained in receptacle 27, optical fiber 16 is aligned with an IrDA transceiver 28 which provides an IR data port of outlet 11. Transceiver 28 is connected to a controller/interface block 30 which may be comprised of a microcontroller, one or more digital signal processors (DSP's), an application specific integrated circuit (ASIC), or a combination of these. Block 30 interfaces the data streams between portable device 10 and the telephone system and/or between portable device 10 and the computer data network. Although fixed outlet 11 is shown having network access to both a telephone system and a data network, the invention can also be used with either type of network access alone.

Fixed outlet 11 includes telephone equipment 31 (e.g., a handset, a ringer, and a dialing circuit) connected to control block 30. A dual-tone multi-frequency (DTMF) generator 32 is connected to phone 31 and to control block 30. In order to transfer call set-up information such as a dialed telephone number, telephone card number, and PIN number to phone 31, a software application executing in PDA 10 is activated by the user to transmit or "beam" the desired data via the fiber optic system to transceiver 28. An encoded digital data stream from transceiver 28 is decoded in control block 30 and a corresponding software application uses the decoded data to control a phone call via DTMF generator 32. For example, control block 30 may take phone 31 off-hook (or the handset may be manually taken off hook by the user) and then a telephone number sent from PDA 10 is dialed by causing the appropriate DTMF tones to be generated in sequence. Then the user may initiate an action on PDA 10 for supplying a phone card number and/or PIN number after PSTN 12 has given a voice prompt to request the information (e.g., PSTN 12 includes an IVR or intelligent voice response unit for receiving DTMF tones and performing desired actions within PSTN 12).

Fixed outlet 11 further includes equipment to interface with a data network such as a data modem 33 connected to control block 30. Alternatively, another wideband network gateway or a dial-up interface could be provided. In an alternative embodiment using DSL (not shown), a shared telephone line to PSTN 12 and WAN 13 is employed (with highpass and lowpass filters to separate voice and data traffic) as is known in the art. Conventional software programs can also be used to provide the necessary functionality of PDA 10 and outlet 11 to generate and receive the desired computer data and to encode and decode signals for IrDA transmission.

Because portable device 10 is not a known or trusted device within a particular data network being accessed, an authentication, authorization, and accounting (AAA) server 34 is connected within WAN 13 to control the data network access via fixed outlet 11. AAA server 34 interacts with access and gateway servers in a conventional manner (e.g., using RADIUS) to obtain identification and billing information from a user. Thus, fixed outlet 11 acts as a pass-through link to the data network that is blocked by an access router on the WAN side of the data connection until appropriate authentication, authorization, and accounting functions have been performed by the user.

Figure 2:
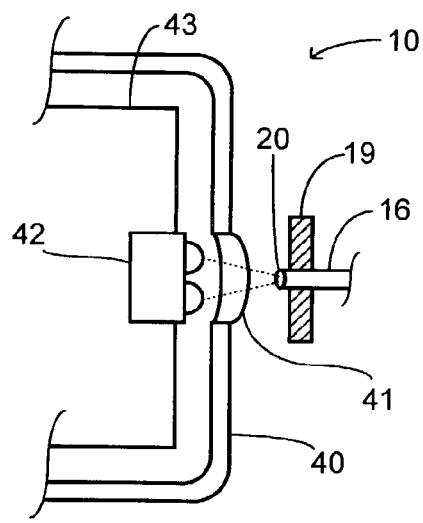
FIG. 2 is a top cross-sectional view of a first embodiment for deploying an optical fiber in alignment with an IR transceiver.

Details of the fiber optic system are shown in greater detail in FIGS. 2-7. As shown in FIG. 2, PDA 10 includes a lower shell portion 40 having an opening for retaining an IR-transmissive window 41. An IrDA-compliant transceiver 42 is mounted to a printed circuit board 43 which preferably also contains other electronic components (not shown) such as a microprocessor, an IrDA encoder/decoder, a power supply, and others. Transceiver 42 may, for example, be comprised of an HSDL-2300 Infrared IrDA Compliant 4 Mb/s 3.3 V Transceiver available from Agilent Technologies, Inc., of Palo Alto, Calif.

The slip-on fiber optic accessory (only partially shown) locates end 20 of optical fiber 16 in alignment with transceiver 42 by means of fiber mount 19. End 20 is preferably kept as close to window 41 as possible in order to maximize its apparent angular size as seen from transceiver 42 (while staying within the radiation cones of the transmitter and receiver portions), thereby maximizing the amount of IR radiation coupled into optical fiber 16.

Figure 3:
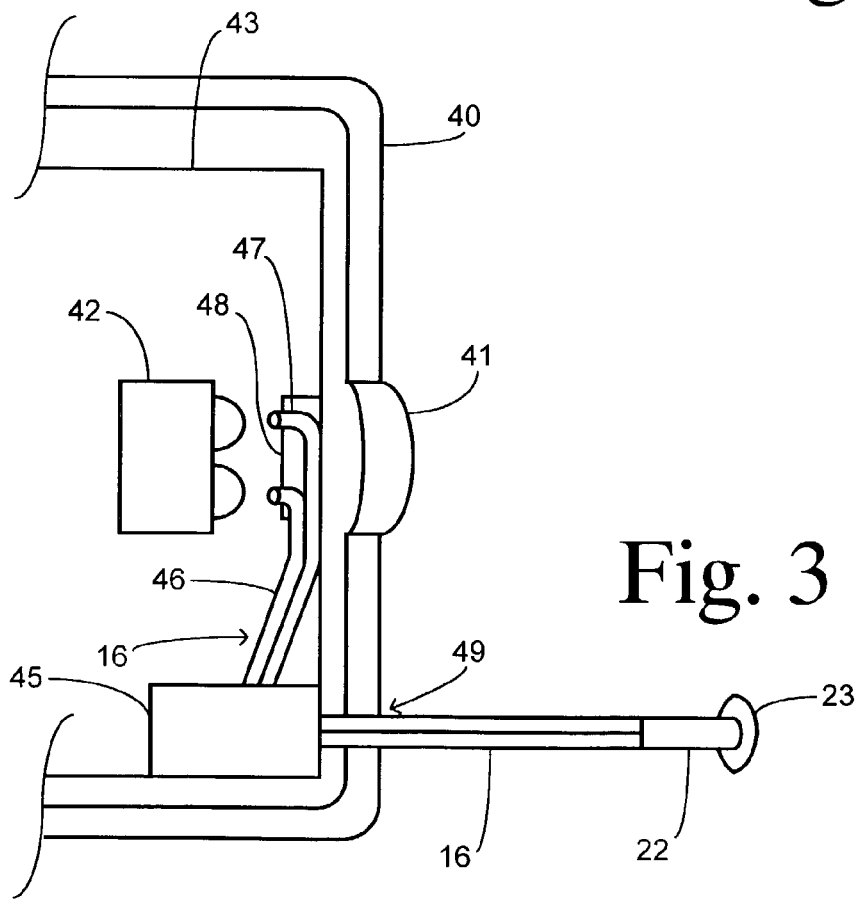
FIG. 3 is a top cross-sectional view of an embodiment for deploying a pair of optical fibers in alignment with an IR transceiver on the interior of a portable computing device.

As shown in FIG. 3, the fiber optic system can be incorporated into the portable computing device. Thus, transceiver 42 is backed off slightly from window 41 to accommodate optical fiber 16. Due to the closer proximity of optical fiber 16 to the transceiver lenses, it becomes more difficult to locate the end of the optical fiber within the radiation cones of both the emitter and the receiver. Therefore, optical fiber 16 may comprise a first optical fiber element 46 and a second optical fiber element 47, each comprising a distinct fiber and the two distinct fibers are preferably joined along their lengths to provide a flexible cable. The first ends of optical fiber elements 46 and 47 are mounted in place by a mounting block 48, the elements being aligned with a respective one of the transceiver lenses. The second ends of elements 46 and 47 are preferably retained within ferrule 22 and collar 23 in relationship to a reference position (i.e., keyed) so that the position of elements 46 and 47 can be determined when connecting to the receptacle of a fixed network outlet. Preferably, the first element is aligned with the infrared transmitter of transceiver 42 at its first end and with the infrared receiver of the fixed network outlet at its second end, and the second element is aligned with the infrared receiver of transceiver 42 at the first end and the infrared transmitter of the fixed network outlet at its second end.

The integrated embodiment of FIG. 3 has spool 45 mounted in the interior of PDA 10 with optical fiber 16 passing through an aperture 49 in shell 40.

Figure 4:
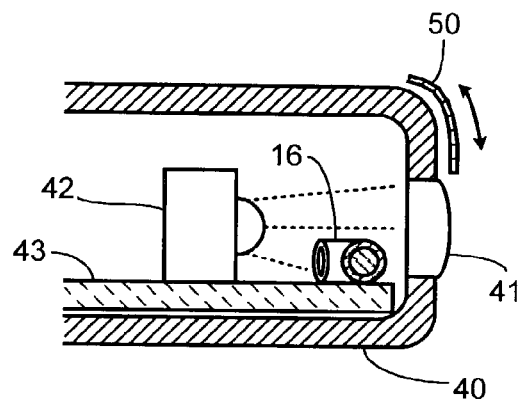
FIG. 4 is a side cross-sectional view of an embodiment having a single optical fiber on the interior of the portable computing device and an exterior shutter.

Using an integrated fiber optic system, it may be desirable to maintain the capability of IR beaming through open air (i.e., without using the fiber optic system). Therefore, optical fiber 16 is preferably positioned to intercept only a portion of the radiation cones of the IR transceiver in order to allow a further portion of the cones to penetrate window 41. FIG. 4 shows a side view of an embodiment using a single optical fiber which intercepts a lower portion of the radiation cones within the interior of the portable computing device. When the fiber optic system is being used, it is preferable to block the open air radiation of IR so that it cannot be intercepted by third parties. Therefore, a slidable shutter or curtain 50 is affixed to an outer covering of the portable computing device to selectably cover window 41. Shutter 50 may slide along retention slots (not shown), may be elastically deformed between open and closed positions, or may use any other suitable mechanism.

Figure 5:
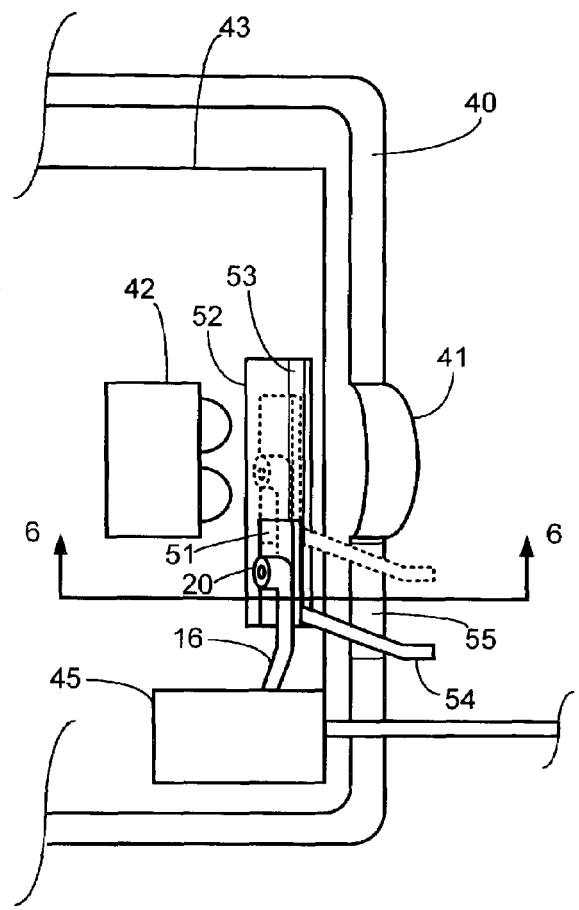
FIG. 5 is a top cross-sectional view of another embodiment for deploying an optical fiber on the interior of a portable computing device.
Figure 6:
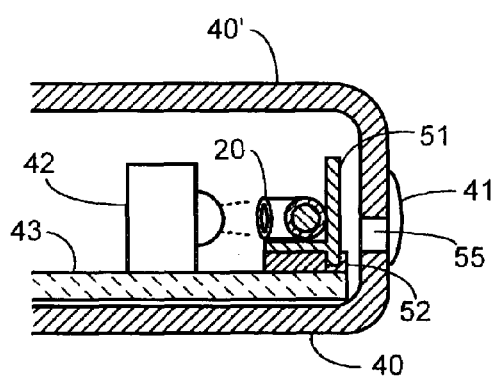
FIG. 6 is a side cross-sectional view taken along line 6-6 of FIG. 5.

FIG. 5 shows an alternative embodiment with an internal shutter 51 that is slidable along with end 20 of optical fiber 16. A base 52 includes a slot 53 for guiding moveable shutter 51 between an open-air beaming position (shown in solid lines) and a fiber-optic beaming position (shown in dashed lines). A push lever 54 extending from shutter 51 through a slot 55 in shell 40 allows either position to be manually selected. As shown by cross section in FIG. 6, end 20 of the optical fiber can be more directly aligned with the lenses of transceiver 42. Slot 55 is created by a partial gap between lower shell 40 and an upper shell 40'.

Figure 7:
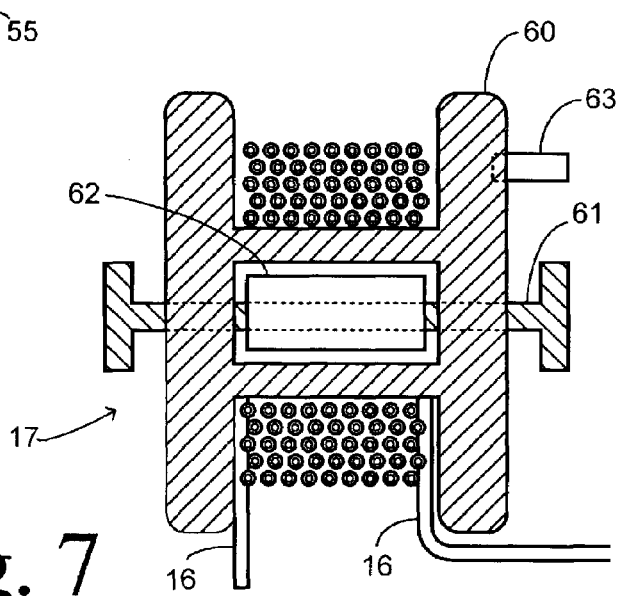
FIG. 7 is a side cross-sectional view of a spool of the present invention.

Retractable spool 17 is shown in greater detail in FIG. 7. A spool body 60 is rotationally mounted to an axle 61 which is fixed within the fiber optic system (e.g., to the sleeve member of FIG. 1 or to the housing shell of FIGS. 3-6). A spring 62 (such as a leaf spring or a coil spring) is mounted between spool body 60 and axle 61 so that when fiber is fed out from the reel, energy is stored in the spring which can then be used to assist in re-coiling the fiber onto spool body 60 when being retracted. A brake 63 selectably engages mating features (not shown) in spool body 60 to maintain a desired position of the spool after a desired amount of optical fiber has been extended for use. Brake 63 can be disengaged in a known manner, such as by a manual lever (not shown) or a quick tug to disengage brake 63 from a catchment (not shown).

What is claimed is:

1. A secure communication system comprising:
  a portable computing device having an infrared beaming port capable of bidirectional serial communication via open air radiation of infrared pulses, wherein said portable computing device is comprised of a personal digital assistant (PDA) having an infrared beaming window; a fiber optic system releasably attached to said portable computing device and including an optical fiber, a retractable spool for retaining said optical fiber, a fiber mount for mounting a first end of said optical fiber in alignment with said infrared beaming port of said portable computing device, and a terminator at a second end of said optical fiber, wherein said fiber optic system further includes a sleeve for retaining said optical fiber in alignment with said infrared beaming window and for blocking infrared transmission from said infrared beaming window other than through said optical fiber; and a public network outlet in a fixed location and having an infrared data port in communication with an optical fiber connector adapted to receive said terminator, said infrared data port being in bidirectional serial communication with said infrared beaming port via said optical fiber in order to authenticate said portable computing device and to provide public network services in response to said authentication.

2. The system of claim 1 wherein said optical fiber is comprised of a cable having first and second fiber elements, said first element being aligned with an infrared transmitter of said portable computing device and an infrared receiver of said public network outlet, and said second element being aligned with an infrared receiver of said portable computing device and an infrared transmitter of said public network outlet.

3. The system of claim 1 wherein said terminator is comprised of a ferrule having a collar and wherein said optical fiber connector includes a retainer for retaining said collar.

4. The system of claim 1 wherein said optical fiber connector includes an environmental cover for protecting said optical fiber connector when an optical fiber is not connected thereto.

5. The system of claim 1 wherein said public network outlet is comprised of a payphone connected to a public switched telephone network.

6. The system of claim 1 wherein said public network outlet is comprised of a wide area network connection to an internetwork.

7. A secure communication system comprising:
  a portable computing device having an infrared beaming port capable of bidirectional serial communication via open air radiation of infrared pulses; a fiber optic system including an optical fiber, a retractable spool for retaining said optical fiber, a fiber mount for mounting a first end of said optical fiber in alignment with said infrared beaming port of said portable computing device, a terminator at a second end of said optical fiber, and a shutter to selectably block infrared transmission from said infrared beaming window to open air; and a public network outlet in a fixed location and having an infrared data port in communication with an optical fiber connector adapted to receive said terminator, said infrared data port being in bidirectional serial communication with said infrared beaming port via said optical fiber in order to authenticate said portable computing device and to provide public network services in response to said authentication; wherein said portable computing device includes a housing, wherein said retractable spool and said fiber mount are installed inside said housing, and wherein said optical fiber is paid-out through an aperture in said housing; and wherein said portable computing device is comprised of a personal digital assistant (PDA) having an infrared beaming window and wherein infrared transmission to and from said infrared beaming port is divided between said optical fiber and said infrared beaming window.

8. A secure communication system comprising:

a portable computing device having an infrared beaming port capable of bidirectional serial communication via open air radiation of infrared pulses; a fiber optic system including an optical fiber, a retractable spool for retaining said optical fiber, a fiber mount for mounting a first end of said optical fiber in alignment with said infrared beaming port of said portable computing device, and a terminator at a second end of said optical fiber; and a public network outlet in a fixed location and having an infrared data port in communication with an optical fiber connector adapted to receive said terminator, said infrared data port being in bidirectional serial communication with said infrared beaming port via said optical fiber in order to authenticate said portable computing device and to provide public network services in response to said authentication; wherein said portable computing device includes a housing, wherein said retractable spool and said fiber mount are installed inside said housing, and wherein said optical fiber is paid-out through an aperture in said housing; and wherein said fiber mount is moveable between a first position for directing infrared transmission to and from said infrared beaming port through said optical fiber and for blocking infrared transmission from said infrared beaming window other than through said optical fiber and a second position for directing infrared transmission to and from said infrared beaming port via open air.

* * * * *